(12) United States Patent
Higuchi et al.

(10) Patent No.: US 8,950,861 B2
(45) Date of Patent: Feb. 10, 2015

(54) EYEGLASS LENS AND METHOD OF MANUFACTURING THE SAME

(75) Inventors: Hisashi Higuchi, Patumthani (TH); Kenji Takashiba, Patumthani (TH); Jutathap Wisuthtatip, Patumthani (TH); Toshihide Tsukatani, Fukui (JP); Xawkat Ahmat, Fukui (JP); Hirotaka Kinoshita, Fukui (JP)

(73) Assignee: HOYA Lens Thailand Ltd., Patumthani (TH)

( * ) Notice: Subject to any disclaimer, the term of this patent is extended or adjusted under 35 U.S.C. 154(b) by 0 days.

(21) Appl. No.: 13/537,674

(22) Filed: Jun. 29, 2012

(65) Prior Publication Data

US 2013/0342809 A1    Dec. 26, 2013

(30) Foreign Application Priority Data

Jun. 22, 2012   (JP) ................. 2012-141217

(51) Int. Cl.
    *G02C 3/00*     (2006.01)
    *G02C 7/16*     (2006.01)
    *G02B 1/12*     (2006.01)
    *G02B 1/11*     (2006.01)
    *G02B 1/10*     (2006.01)

(52) U.S. Cl.
    CPC .. *G02B 1/12* (2013.01); *G02B 1/11* (2013.01); *G02B 1/105* (2013.01)
    USPC .................................. 351/159.57

(58) Field of Classification Search
    USPC .................................. 351/159.57
    See application file for complete search history.

(56) References Cited

U.S. PATENT DOCUMENTS

| | | | |
|---|---|---|---|
| 2005/0233070 A1* | 10/2005 | Pellerite et al. | 427/164 |
| 2008/0050600 A1* | 2/2008 | Fan et al. | 428/447 |
| 2009/0143543 A1* | 6/2009 | Yamane et al. | 525/474 |
| 2009/0155581 A1* | 6/2009 | Lee et al. | 428/336 |

* cited by examiner

*Primary Examiner* — Scott J Sugarman
*Assistant Examiner* — Mustak Choudhury
(74) *Attorney, Agent, or Firm* — Sughrue Mion, PLLC

(57) ABSTRACT

An aspect of the present invention relates to an eyeglass lens, which comprises an outermost layer in the form of a water-repellent vapor deposition film formed by vapor depositing a vapor deposition material in the form of a perfluoropolyether-modified silane compound denoted by general formula (I):

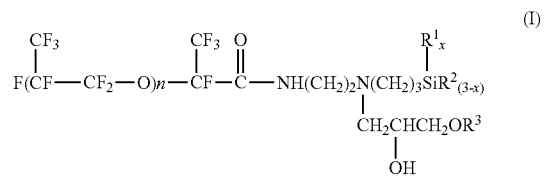

wherein, in general formula (I), $R^1$ denotes an alkyl group with 1 or 2 carbon atoms, x denotes 1 or 0, $R^2$ denotes an alkoxy group with 1 or 2 carbon atoms, $R^3$ denotes a hydrogen atom or a phenyl group, and n denotes an integer ranging from 10 to 40.

13 Claims, No Drawings

EYEGLASS LENS AND METHOD OF MANUFACTURING THE SAME

CROSS-REFERENCE TO RELATED APPLICATIONS

This application claims the benefit of priority under 35 USC 119 to Japanese Patent Application No. 2012-141217 filed on Jun. 22, 2012, which is expressly incorporated herein by reference in its entirety.

BACKGROUND OF THE INVENTION

1. Field of the Invention

The present invention relates to an eyeglass lens and to a method of manufacturing the same. More particularly, the present invention relates to an eyeglass lens having a water-repellent thin film on the outermost surface thereof that is capable of effectively preventing the adhesion and retention of water droplets, and to a method of manufacturing the same.

2. Discussion of the Background

A water-repellent thin film is currently formed as the outermost layer of most eyeglass lenses to prevent the adhesion of water droplets, sweat, and grime such as fingerprints, and to facilitate their removal. Various water-repellent agents for forming such water-repellent thin films and various methods of forming water-repellent thin films have been examined in recent years (see Reference 1 (Japanese Unexamined Patent Publication (KOKAI) Heisei No. 05-215905), Reference 2 (Japanese Unexamined Patent Publication (KOKAI) Heisei No. 10-133001), Reference 3 (Japanese Unexamined Patent Publication (KOKAI) No. 2003-238577) or English language family member US2003/139620A1, and Reference 4 (WO2009/028389) or English language family member US2011/117273A1, which are expressly incorporated herein by reference in their entirety.

The water droplets that adhere to the outermost layer of an eyeglass lens hinder the view of the wearer. When the water dries, the traces of the water droplets that are produced (so-called water spots) not only impede the view of the wearer, but also compromise the external appearance of the eyeglass lens. Thus, it is desirable to impart to the outermost surface of an eyeglass lens a level of water repellency that is adequate to effectively prevent the adhesion and retention of water droplets on the outermost surface thereof. However, conventional methods, including the methods described in References 1 to 4, does not necessarily impart adequate water repellency to the outermost surface of an eyeglass lens in this respect. Accordingly, there is a need to further enhance the water repellency of the outermost surface of an eyeglass lens to prevent the adhesion of water droplets and the generation of water spots on the outermost surface thereof.

SUMMARY OF THE INVENTION

An aspect of the present invention provides for an eyeglass lens having a thin film exhibiting excellent water repellency on the outermost layer thereof.

The present inventors conducted extensive research in order to obtain the above eyeglass lens. As a result, they discovered that by employing the perfluoropolyether-modified silane compound denoted by general formula (I) below as a vapor deposition material, it was possible to increase the contact angle relative to water—that is, the water repellency—of a vapor deposition film formed by the same vapor deposition method and vapor deposition conditions as when employing a conventionally known water-repellent agent as a vapor deposition material. The present invention was devised on that basis.

An aspect of the present invention relates to an eyeglass lens, which comprises an outermost layer in the form of a water-repellent vapor deposition film formed by vapor depositing a vapor deposition material in the form of a perfluoropolyether-modified silane compound denoted by general formula (I):

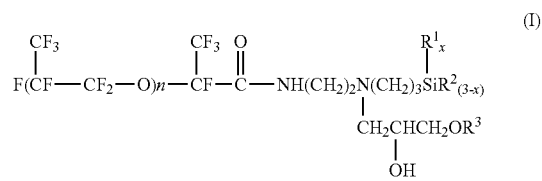

wherein, in general formula (I), $R^1$ denotes an alkyl group with 1 or 2 carbon atoms, x denotes 1 or 0, $R^2$ denotes an alkoxy group with 1 or 2 carbon atoms, $R^3$ denotes a hydrogen atom or a phenyl group, and n denotes an integer ranging from 10 to 40.

In one embodiment, the water-repellent vapor deposition film is disposed adjacent to a vapor deposition film formed by vapor depositing a vapor deposition material in the form of silicon oxide.

In one embodiment, the vapor deposition film formed by vapor depositing a vapor deposition material in the form of silicon oxide is an uppermost layer of a multilayered antireflective film, and a lowermost layer of the multilayered antireflective film is a vapor deposition film formed by vapor depositing a vapor deposition material in the form of silicon oxide.

In one embodiment, the vapor deposition film of the lowermost layer is disposed adjacent to a hardcoat layer, and in another embodiment, the hardcoat layer comprises silica colloidal particles.

In one embodiment, the multilayered antireflective film comprises plural vapor deposition films formed by vapor depositing a vapor deposition material in the form of silicon oxide and plural vapor depositions film formed by vapor depositing a vapor deposition material in the form of zirconium oxide, and the vapor deposition film formed by vapor depositing a vapor deposition material in the form of silicon oxide and a vapor deposition film formed by vapor depositing the vapor deposition material in the form of zirconium oxide are alternately disposed.

In one embodiment, the perfluoropolyether-modified silane compound is:

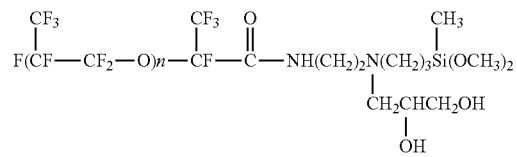

wherein n is defined in the same manner as in general formula (I).

In one embodiment, the perfluoropolyether-modified silane compound is:

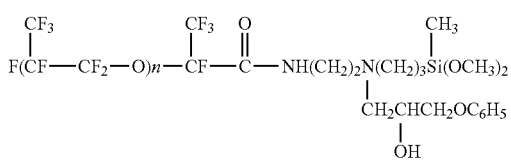

wherein n is defined in the same manner as in general formula (I).

In one embodiment, the water-repellent vapor deposition film has a film thickness ranging from 0.1 nm to 5 μm.

In one embodiment, the eyeglass lens comprises the water-repellent vapor deposition film directly or indirectly on a polycarbonate lens substrate.

A further aspect of the present invention relates to a method of manufacturing an eyeglass lens comprising an outermost layer in the form of a water-repellent vapor deposition film, which comprises a step of forming the water-repellent vapor deposition film by vapor depositing a vapor deposition material in the form of the perfluoropolyether-modified silane compound denoted by the above general formula (I) directly or indirectly on a lens substrate.

In one embodiment, the water-repellent vapor deposition film is formed on a vapor deposition film formed by vapor depositing a vapor deposition material in the form of silicon oxide.

In one embodiment, the vapor deposition for forming the water-repellent vapor deposition film is carried out by vacuum vapor deposition.

In one embodiment, the above method of manufacturing an eyeglass lens comprises carrying out the vacuum vapor deposition in a vapor deposition chamber which is kept to a degree of vacuum of equal to or lower than $3.0 \times 10^{-2}$ Pa.

In one embodiment, the above method of manufacturing an eyeglass lens comprises carrying out the vacuum vapor deposition at a heating temperature of equal to or higher than 500° C.

In one embodiment, the perfluoropolyether-modified silane compound is:

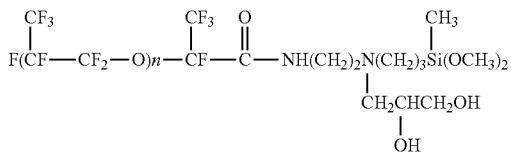

wherein n is defined in the same manner as in general formula (I).

In one embodiment, the perfluoropolyether-modified silane compound is:

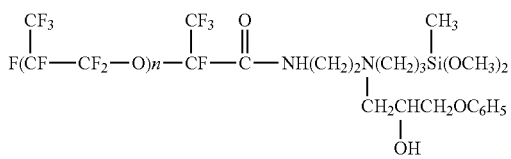

wherein n is defined in the same manner as in general formula (I).

The present invention makes it possible to impart excellent water repellency to the outermost surface of an eyeglass lens, making it possible to provide an eyeglass lens in which the adhesion and retention of water droplets to the outermost surface, which may impede the view of the wearer and compromise the external appearance of the eyeglass lens, are prevented.

Other exemplary embodiments and advantages of the present invention may be ascertained by reviewing the present disclosure.

DETAILED DESCRIPTION OF THE EMBODIMENTS

Unless otherwise stated, a reference to a compound or component includes the compound or component by itself, as well as in combination with other compounds or components, such as mixtures of compounds.

As used herein, the singular forms "a," "an," and "the" include the plural reference unless the context clearly dictates otherwise.

Except where otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not to be considered as an attempt to limit the application of the doctrine of equivalents to the scope of the claims, each numerical parameter should be construed in light of the number of significant digits and ordinary rounding conventions.

Additionally, the recitation of numerical ranges within this specification is considered to be a disclosure of all numerical values and ranges within that range. For example, if a range is from about 1 to about 50, it is deemed to include, for example, 1, 7, 34, 46.1, 23.7, or any other value or range within the range.

The following preferred specific embodiments are, therefore, to be construed as merely illustrative, and non-limiting to the remainder of the disclosure in any way whatsoever. In this regard, no attempt is made to show structural details of the present invention in more detail than is necessary for fundamental understanding of the present invention; the description making apparent to those skilled in the art how several forms of the present invention may be embodied in practice.

An aspect of the present invention relates to an eyeglass lens, which comprises an outermost layer in the form of a water-repellent vapor deposition film formed by vapor depositing a vapor deposition material in the form of a perfluoropolyether-modified silane compound denoted by general formula (I):

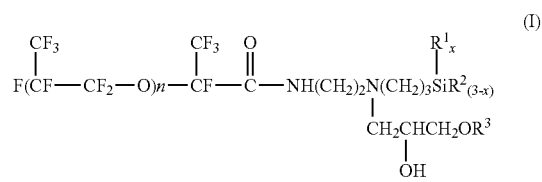

wherein, in general formula (I), $R^1$ denotes an alkyl group with 1 or 2 carbon atoms, x denotes 1 or 0, $R^2$ denotes an alkoxy group with 1 or 2 carbon atoms, $R^3$ denotes a hydrogen atom or a phenyl group, and n denotes an integer ranging from 10 to 40.

A further aspect of the present invention relates to a method of manufacturing an eyeglass lens comprising an outermost layer in the form of a water-repellent vapor deposition film, which comprises a step of forming the water-repellent vapor deposition film by vapor depositing a vapor deposition material in the form of the above perfluoropolyether-modified silane compound denoted by general formula (I) directly or indirectly on a lens substrate.

The eyeglass lens and method of manufacturing an eyeglass lens of the present invention will be described in greater detail below.

The water-repellent vapor deposition film is positioned as the outermost layer of at least either the object-side surface or eyeball-side surface of the eyeglass lens of the present invention. The object-side surface refers to the surface disposed on the object side, and the eyeball-side surface refers to the surface disposed on the eyeball side, when wearing eyeglasses fabricated by placing the eyeglass lens of the present invention within a frame. Since water droplets such as raindrops tend to adhere to the object-side surface, the water-repellent thin film is desirably positioned on at least the object-side surface.

Generally, an eyeglass lens comprises at least a structural element in the form of a lens substrate, with various functional films for imparting desired properties being formed on the eyeglass lens. The water-repellent vapor deposition film can be directly formed on the lens substrate, or can be indirectly formed through one or more functional films on the lens substrate. The lens substrate is not specifically limited. Materials that are commonly employed as lens substrates in eyeglass lenses, such as plastics such as polyurethane, polythiourethane, polycarbonate, and diethylene glycol bisallyl carbonate, as well as inorganic glass can be employed. Neither the thickness nor diameter of the lens substrate is specifically limited. Normally, the thickness is about 1 mm to about 30 mm and the diameter is about 50 mm to about 100 mm. When the eyeglass lens of the present invention is an eyeglass lens for correcting vision, a lens substrate with a refractive index nd of about 1.5 to about 1.8 is often employed. Normally, a colorless lens is employed as the lens substrate. However, to the extent that transparency is not lost, a colored lens can also be employed.

The functional films that can be present between the lens substrate and the water-repellent vapor deposition film are not specifically limited. Examples are a hardcoat layer that can enhance durability, a primer layer (adhesive layer) that can enhance adhesion, and an antireflective layer that can enhance antireflective performance. All of these functional films can be formed by known methods. The thickness of any of these functional films that is optionally formed can be established within a range that yields the desired function, and is not specifically limited. Some lens substrates are sold with a hardcoat layer to prevent scratching during storage and distribution. Such lens substrates can be employed in the present invention.

A desirable example of the hardcoat layer is a protective film that is formed by coating and drying the coating composition described in Japanese Unexamined Patent Publication (KOKAI) Showa No. 63-10640, which is expressly incorporated herein by reference in its entirety. Hardcoat layers containing inorganic oxide particles, such as the above protective film, have high hardness and thus can contribute to improvement of durability of the eyeglass lens. The inorganic oxide particles are desirably silica particles, and preferably silica colloidal particles (colloidal silica), from the perspective of forming an optically homogeneous hardcoat layer. The layer (also referred to as upper layer) adjacent to the hardcoat layer desirably contains silicon oxide, such as a vapor deposition film formed by vapor depositing a vapor deposition material in the form of silicon oxide, described further below, from the perspective of adhesion of the hardcoat layer with the upper layer. With regard to the terms "upper" and "lower" employed for layers contained in an eyeglass lens in the present invention, "upper" is employed for the layer farther away from the lens substrate and "lower" is employed for the layer closer to the lens substrate.

The water-repellent vapor deposition film is formed directly on the lens substrate set forth above, or formed indirectly thereupon through one or more functional film described above. The vapor deposition material employed to form the water-repellent vapor deposition film will be described below.

The water-repellent vapor deposition film is formed by vapor depositing a vapor deposition material in the form of the perfluoropolyether-modified silane compound denoted by general formula (I) below.

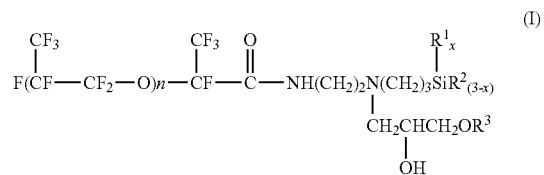

In general formula (I), $R^1$ denotes an alkyl group with 1 or 2 carbon atoms, specifically a methyl group or an ethyl group. From the perspective of adhesion to the surface on which the vapor deposition is being conducted, a methyl group is desirable.

x denotes 1 or 0. From the perspective of adhesion to the surface on which the vapor deposition is being conducted, 1 is desirable.

$R^2$ denotes an alkoxy group with 1 or 2 carbon atoms, specifically a methoxy group or an ethoxy group. From the perspective of adhesion to the surface on which the vapor deposition is being conducted, a methoxy group is desirable.

$R^3$ denotes a hydrogen atom or a phenyl group. From the perspective of adhesion to the surface on which the vapor deposition is being conducted, a hydrogen atom is desirable.

n denotes an integer falling within a range of 10 to 40. From the perspective of the performance of the vapor deposition film that is formed, an integer ranging from 10 to 30 is desirable.

Methods of synthesizing perfluoropolyether-modified silane compounds are known in the field of art. The perfluoropolyether-modified silane compound denoted by general formula (I) can be readily obtained by known synthesis methods.

The following structures are specific examples of the perfluoropolyether-modified silane compound denoted by general formula (I) as set forth above. The present invention is not limited to these specific examples. Below, n is defined as in general formula (I).

Specific Example (1)

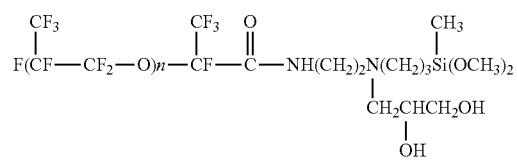

Specific Example (2)

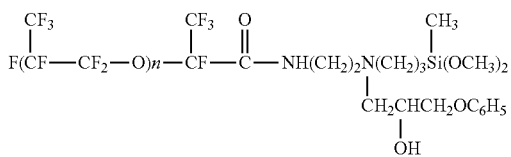

The perfluoropolyether-modified silane compound denoted by general formula (I) (also referred to as a "water-repellent agent", hereinafter) has a structure such that on one end thereof, there is a perfluoropolyether group that is capable of exhibiting water repellency, and on the other end thereof, there is a combination of a silicon-containing substituent ($-Si(R^1)_x(R^2)_{(3-x)}$) that is capable of reacting with the adjacent surface and exhibiting adhesion, and a high polarity functional group such as a hydroxyl group or a phenyl group that can exhibit good orientation to high polarity surfaces such as glass and silicon oxide. When a water-repellent agent with such a structure is vapor deposited on a surface of a lens substrate or a functional film, the silicon-containing substituent and the high polarity functional group in the form of a hydroxyl group or phenyl group are thought to strongly adhere, orient, and react on the surface on which the vapor deposition is being conducted, promoting the tendency of the perfluoropolyether group to orient on the outermost surface. The perfluoropolyether group of the water-repellent agent comprises a —$CF_3$ group within the unit segment. The —$CF_3$ group is a functional group with less free energy than a —$CF_2$— group. In addition, it is branched. Therefore, it is thought to be positioned the furthest outside stereochemically. Causing such a perfluoropolyether group to be oriented on the outermost surface of the lens can lower the surface energy. As a result, extremely good water repellency is thought to be imparted to the surface of the eyeglass lens. The water-repellent agent can exhibit better orientation relative to the surface on which the vapor deposition is being conducted than conventional water-repellent agents. As a result, the orientation of the perfluoropolyether group on the outermost surface of the lens can be enhanced, which is thought to make it possible to achieve good water repellency with just a small quantity.

The surface on which the water-repellent agent is vapor deposited is not specifically limited. From the perspective of achieving good orientation due to the high polarity functional group (hydroxyl group or phenyl group) contained in general formula (I), the surface on which the vapor deposition is being conducted is desirably a highly polar surface such as glass or silicon oxide. A specific example of a highly polar surface formed of glass is the surface of a lens substrate made of glass. Additionally, specific examples of high polarity surfaces formed of silicon oxide are vapor deposition film surfaces formed by vapor depositing a vapor deposition material in the form of silicon oxide such as $SiO_2$. The antireflective film given by way of example of a functional film above can be formed as a multilayered vapor deposition film that is laminated by alternating a high refractive index material and a low refractive index material of optical film thicknesses determined based on the wavelength of the light to be reflected and the refractive index of the film material. Silicon oxide such as $SiO_2$ is normally employed as a low refractive index material. The eyeglass lens of the present invention can contain a vapor deposition film formed by vapor depositing a vapor deposition material in the form of silicon oxide such as $SiO_2$, as an outermost layer of such a multilayered vapor deposition film. As the high refractive index material, for example, zirconium oxide such as $ZrO_2$ can be employed.

One water-repellent agent, or a mixture of two or more water-repellent agents, can be employed as the vapor deposition material. A portion of the water-repellent agent can be incorporated as a hydrolysis-condensation product into the vapor deposition material.

The water repellent agent can be employed as is or diluted with a suitable solvent for use as the vapor deposition material. A solvent that is commonly employed in the art can be used; there is no specific limitation. Examples are perfluoroheptane, perfluorohexane, m-xylene hexafluoride, benzotrifluoride, methyl perfluorobutyl ether, ethyl perfluorobutyl ether, perfluoro(2-butyltetrahydrofuran), 1,1,1,2,3,3-hexafluoro-4-(1,1,2,3,3,3-hexafluoropropoxy)pentane, methyl perfluorohexyl ether, and other fluorine-modified hydrocarbon solvents. These solvents may be employed singly, or in combinations of two or more.

The concentration of the water-repellent agent in the water-repellent agent solution obtained by diluting the water repellent agent with solvent is not specifically limited. It can be suitably determined based on the vapor deposition conditions, desired film thickness, and the like. The vapor deposition material can be charged to a suitable vessel, or impregnated into a porous material, and employed to form a water-repellent vapor deposition film.

The water-repellent vapor deposition film can be formed by various vapor deposition methods, such as the vacuum vapor deposition method, ion plating method, plasma CVD method, ion-assisted method, and reactive sputtering method. From the perspective of obtaining a vapor deposition film affording better water repellency, the vacuum vapor deposition method is desirably employed. To further enhance water repellency, it is desirable to orient the perfluoropolyether groups contained in the water-repellent agent to a high degree with the surface of the water-repellent vapor deposition film. To that end, in vacuum vapor deposition, the heating temperature during vapor deposition is desirably equal to or higher than 500° C., preferably equal to or higher than 550° C., more preferably equal to or higher than 600° C., still more preferably equal to or higher than 650° C., and yet still more preferably, equal to or higher than 700° C. In the present invention, the heating temperature relating to vapor deposition refers to the atmospheric temperature (for example, the atmospheric temperature within the vapor deposition device) to which the vapor deposition material is exposed during vapor deposition. From the perspective of forming a water-repellent vapor deposition film affording even better water repellency, the heating temperature during vacuum vapor deposition is desirably equal to or higher than 700° C., for example, falling within a range of 700 to 900° C. From the perspective of orienting the perfluoropolyether groups to a high degree with the outermost surface of the eyeglass lens, the vacuum vapor deposition is desirably conducted in a vapor deposition chamber that is kept to a degree of vacuum of equal to or lower than $3.0\times10^{-2}$ Pa.

In the vapor deposition, by heating the perfluoropolyether-modified silane compound denoted by general formula (I) and causing it to adhere to the surface of a lens substrate, or the surface of a functional film formed on a lens substrate, that has been placed in a vapor deposition device, a water-repellent vapor deposition film is formed on the surface. The thickness of the water-repellent vapor deposition film thus formed is not specifically limited. For example, it can be about 0.1 nm to about 5 μm, and can be controlled by the vapor deposition conditions, the quantity of vapor deposition material employed, and the like.

The above-described water-repellent vapor deposition film can function to prevent the adhesion and retention of water droplets. It can also function to prevent the adhesion of sweat and fingerprints, and as a grime-combating layer that facilitates their removal.

EXAMPLES

The present invention will be described in detail below based on Examples. However, the present invention is not limited to Examples.

Example 1

1. Synthesis of the Water-Repellent Agent

Step One: Synthesis of Perfluoropolyether Compound

To a stainless steel high-pressure reactor equipped with stirrer, cooling jacket, temperature gauge, and pressure gauge were charged 2.49 g of tetraglyme, 1.69 g of cesium fluoride, 87.75 g of hexafluoropropylene, and 220 g of hexafluoropropylene oxide. The mixture was reacted at −35° C. to obtain a perfluoropolyether compound in the form of a colorless, transparent liquid. The compound obtained was identified by FT-IR and $^{19}$F-NMR. In FT-IR, the presence of the absorption of —C(O)F was confirmed. In $^{19}$F-NMR, the following peaks were confirmed.

FT-IR and $^{19}$F-NMR spectral data are given for the compound obtained below.

$^{19}$F-NMR
  83.3 ppm s, 3F, CF$_3$CF$_2$—
  131.3 ppm m, 2F, CF$_3$CF$_2$—
  83.2 ppm m, 2F, CF$_3$CF$_2$CF$_2$—
    s, 3F, —CF(CF$_3$)C(O)F
  146.2 ppm t, 1F, —OCF(CF$_3$)CF$_2$—
  81.6 ppm m, 3F, —OCF(CF$_3$)CF$_2$—
    m, 2F, —OCF(CF$_3$)CF$_2$—
  132.0 ppm t, 1F, —CF(CF$_3$)C(O)F
FT-IR
  1880 cm$^{-1}$(—C(O)F)
  1100-1340 cm$^{-1}$(C—F)

Step two: synthesis of methyl esterified perfluoropolyether compound by methyl esterifying perfluoropolyether compound To the perfluoropolyether compound obtained in step one above was added 5 g of methanol. The mixture was stirred for 12 hours at room temperature and the unreacted methanol was removed by vacuum drying to obtain 221 g of methyl esterified perfluoropolyether compound in the form of a transparent, colorless liquid. Measurement by gel permeation chromatography (GPC) revealed the molecular weight of the methyl esterified perfluoropolyether compound to be weight average molecular weight MW=2,300. The fact that hexafluoropropylene oxide was roughly a tridecamer was confirmed (it is referred to as a "methyl esterified perfluoropolyether compound tridecamer", hereinafter).

The GPC measurement conditions were as follows:
  Device employed: Waters 410 Differential Refractometer, Waters 717 plus Auto Sampler, Waters 1525 Binary HPLC Pump
  Solvent employed: R-113 (1,1,2-trichloro-1,2,2-trifluoroethane)
  Temperature: 25° C.
  Flow rate: 1 to 5 µL/min The above compound was identified by FT-IR and $^1$H-NMR. The disappearance of —C(O)F absorption and the presence of —C(O)OCH$_3$ absorption in FT-IR were confirmed. A —OCH$_3$ peak was confirmed in $^1$H-NMR.

The FT-IR and $^1$H-NMR data for the compound obtained are given below.
FT-IR
  1800 cm$^{-1}$(—C(O)OCH$_3$)
$^1$H-NMR (C6F6)
  4.3 ppm s, —OCH$_3$ Step three: synthesis of perfluoropolyether-modified aminosilane compound by reacting methyl esterified perfluoropolyether compound with aminosilane compound To 20 g (8.7 millimoles) of the methyl esterified perfluoropolyether compound tridecamer obtained in step two set forth above was added 10 g of a reaction solvent in the form of 1,3-bis(trifluoromethyl)benzene. After adding 1.97 g (9.57 millimoles) of 3-(2-aminoethyl)aminopropylmethyldimethoxysilane (product name KBM-602, made by Shin-Etsu Chemical Co., Ltd.), the mixture was reacted for 6 hours at 65 to 75° C. in a nitrogen atmosphere and purified by methanol precipitation to obtain 21.50 g of perfluoropolyether-modified aminosilane compound in the form of a transparent pale yellow liquid.

The compound obtained was identified by FT-IR and $^1$H-NMR. The disappearance of —C(O)OCH$_3$ absorption and the presence of —C(O)NH— absorption in FT-IR were confirmed. The following peaks were confirmed in $^1$H-NMR.

The FT-IR and $^1$H-NMR spectral data for the compound obtained are given below.
FT-IR
  1710 cm$^{-1}$(—C(O)NH—)
  1530 cm$^{-1}$(—C(O)NH—)
$^1$H-NMR (C6F6)
  0.11 ppm s, 3H, ≡Si—CH$_2$
  0.7 ppm t, 2H, —CH$_2$—Si≡
  1.74 ppm m, 2H, —CH$_2$CH$_2$CH$_2$—
  2.91 ppm m, 2H, —NH—CH$_2$—
  3.16 ppm m, 2H, —CH$_2$—NH—
  3.43 ppm m, 2H, —C(O)NH—CH$_2$—
  3.56 ppm s, 6H, ≡Si—(OCH$_3$)$_2$ Step four: synthesis of the perfluoropolyether-modified silane compound of the present invention by reacting an epoxy-alcohol compound (a compound having epoxy and hydroxy groups) with the secondary amino group of the perfluoropolyether-modified aminosilane compound To 21.50 g (8.66 millimoles) of the perfluoropolyether-modified aminosilane compound obtained in step three set forth above was added another 10 g of 1,3-bis(trifluoromethyl)benzene as a reaction solvent, followed by 0.77 g (10.43 millimoles) of 3-glycidol. The mixture was reacted for 6 hours at 35 to 45° C. in a nitrogen atmosphere and purified by methanol precipitation to obtain 22.12 g of perfluoropolyether-modified silane compound in the form of a transparent pale yellow liquid.

The compound obtained was identified by FT-IR and $^1$H-NMR. The presence of OH absorption in FT-IR was confirmed. The following peaks were confirmed in $^1$H-NMR. The FT-IR and $^1$H-NMR spectral data for the compound obtained are given below.
FT-IR
  3250-3410 cm$^{-1}$(O—H,N—H)
  2780-3000 cm$^{-1}$(C—H)
  1710 cm$^{-1}$(—C(O)NH—)
  1530 cm$^{-1}$(—CONH—)
  1100-1340 cm$^{-1}$(C—F)

¹H-NMR
    0.11 ppm s, 3H, ≡Si—CH₃
    0.7 ppm t, 2H, —CH₂—Si≡
    2.65-3.15 m, 6H, —CH₂—N(CH₂—)—CH₂—
    3.43 ppm m, 2H, —C(O)NH—CH₂—
    3.63 ppm s, 6H, ≡Si—(OCH₃)₂
    3.71-431 m, 5H, —CH(OH)CH₂OH Based on the above identification results, the perfluoropolyether-modified silane compound obtained in step four set forth above was confirmed to have the structure denoted by chemical formula a below.

[Chemical formula a]

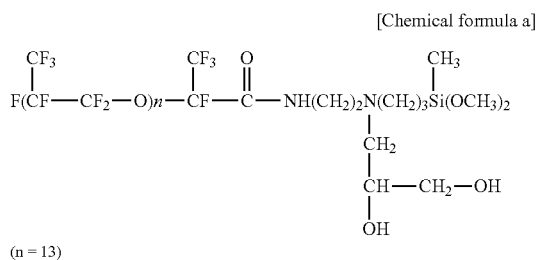

(n = 13)

2. Forming a Water-Repellent Vapor Deposition Film

A primer layer (waterborne polyurethane resin layer containing polycarbonate polyurethane resin), a hardcoat film (the protective film containing silica colloidal particles described in Japanese Unexamined Patent Publication (KOKAI) Showa No. 63-10640 was employed), and an antireflective film (a multilayered film obtained by alternately laminating multiple layers of a vapor deposition film formed using SiO₂ as the vapor deposition material and a vapor deposition film formed using ZrO₂ as the vapor deposition material) were formed in the above-stated order on the surface (convex in shape) of an eyeglass lens substrate (a polycarbonate lens made by HOYA Corporation, refractive index 1.589, −4.00 diopters). Both the lowermost layer and the uppermost (outermost) layer of the multilayered film were SiO₂ vapor deposition film. A water-repellent vapor deposition film was formed by the following method on the surface of the SiO₂ vapor deposition film—the outermost layer—of the multilayered film.

A sintered filter of stainless steel (pore diameter 80 to 100 μm, diameter 18 mm, 3 mm in thickness) that had been impregnated with 0.25 mL of a 20 weight percent solution of the perfluoropolyether-modified silane compound obtained in 1. above (employing methyl perfluorobutyl ether (made by Tokyo Chemical Industry Co., Ltd.) as solvent and referred to hereinafter as "blended solution 1") was heated in a dry oven for one hour at 50° C., and then placed in a vacuum vapor deposition device (CES-1050 vacuum vapor deposition device made by Shincron). The entire sintered filter was heated with a halogen lamp heating unit, and a vapor deposition film was formed on the surface of the SiO₂ vapor deposition film—the outermost layer—of the plastic lens at a heating temperature (also referred to as a vapor deposition temperature) of 700 to 750° C. (degree of vacuum within vapor deposition device: equal to or lower than $1.5 \times 10^{-2}$ Pa). Measurement by optical film thickness measuring device of the vapor deposition film that was formed revealed a thickness of 8 to 10 nm. The vapor deposition condition of Example 1 is referred to as "Condition 1", hereinafter.

To confirm reproducibility, the same operation was conducted to form vapor deposition films on a total of seven plastic lenses.

Example 2

With the exception that the heating temperature during vacuum vapor deposition was changed to within a range of 550 to 650° C., the same operation as in Example 1 was conducted to form vapor deposition films on plastic lenses. The vapor deposition condition in Example 2 is referred to as "Condition 2", hereinafter.

Comparative Example 1

With the exception that blended solution 1 was replaced with a water-repellent coating agent made by Shin-Etsu Chemical Co., Ltd. (product name KY-130, referred to as "blended solution 2", hereinafter), the same operation as in Example 1 was conducted to form vapor deposition films on plastic lenses.

Comparative Example 2

With the exception that blended solution 1 was replaced with a water-repellent coating agent made by Shin-Etsu Chemical Co., Ltd. (product name KP-801, referred to as "blended solution 3", hereinafter), the same operation as in Example 1 was conducted to form vapor deposition films on plastic lenses.

Comparative Example 3

With the exception that blended solution 1 was replaced with blended solution 2, the same operation as in Example 2 was conducted to form vapor deposition films on plastic lenses.

Comparative Example 4

With the exception that blended solution 1 was replaced with blended solution 3, the same operation as in Example 2 was conducted to form vapor deposition films on plastic lenses.

Example 3

With the exception that the water-repellent agent synthesized by the following method was employed as the water-repellent agent contained in the blended solution (referred to as "blended solution 4", hereinafter) was used to form the water-repellent vapor deposition film, the same operation as in Example 1 was conducted to form vapor deposition films on plastic lenses.

With the exception that the 0.77 g (10.43 millimoles) of 3-glycidol was replaced with 1.56 g (10.43 millimoles) of phenyl glycidyl ether in step four of synthesis in Example 1, the same operation was conducted as in the synthesis of the compound denoted by chemical formula a to obtain 22.77 g of a perfluoropolyether-modified silane compound in the form of a transparent pale yellow liquid. Identification of the compound by the same method as that used for chemical formula a revealed the perfluoropolyether-modified silane compound that was obtained to have the structure denoted by chemical formula b.

[Chemical formula b]

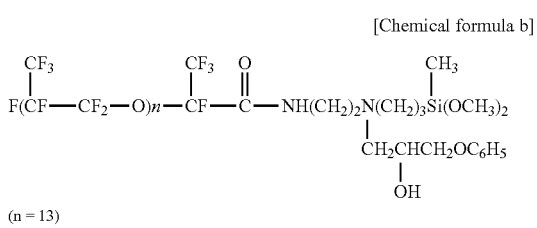

(n = 13)

Measurement of Contact Angle Relative to Water (Static Contact Angle)

The contact angles relative to water of the surfaces of the vapor deposition films formed in the above Examples and comparative examples were measured by the following method.

A contact angle meter (model CA-D, product of Kyowa Interface Science Co., Ltd.) was employed. Water droplets 2 mm in diameter were formed at the tip of the needle at 25° C. and brought into contact with the surface of the vapor deposition film to prepare water droplets. The angle formed between the water droplets and the surface of the vapor deposition film at that time was measured as the static contact angle. The static contact angle θ was calculated from the following equation:

$$\theta = 2 \times \tan^{-1}(h/r)$$

where r denotes the radius of the water droplet (the radius of the portion of the water droplet in contact with the surface of the vapor deposition film) and h denotes the height of the water droplet.

The static contact angle was measured within 10 seconds of bringing the water droplet into contact with the surface of the vapor deposition film to minimize the measurement error due to water evaporation.

Table 1 below gives the contact angles relative to water that were measured for a total of seven sample lenses for each Example and comparative example, and the average values thereof.

These results demonstrate that the present invention can provide an eyeglass lens having good water repellency by simply changing the vapor deposition material without greatly changing the vapor deposition conditions in the existing manufacturing process.

As shown in Table 1, when the perfluoropolyether-modified silane compound denoted by general formula (I) was employed as the vapor deposition material, even when the processing temperature was lowered to vapor deposition condition 2 from vapor deposition condition 1, it was possible to form a water-repellent film exhibiting a water-repellent performance equivalent to or better than that of conventional water repellent agents. Based on these results, the present invention was confirmed to permit both economizing energy and shortening of the processing time when manufacturing eyeglass lenses having water-repellent vapor deposition films.

The present invention is useful in the field of manufacturing eyeglass lenses.

Although the present invention has been described in considerable detail with regard to certain versions thereof, other versions are possible, and alterations, permutations and equivalents of the version shown will become apparent to those skilled in the art upon a reading of the specification and study of the drawings. Also, the various features of the versions herein can be combined in various ways to provide additional versions of the present invention. Furthermore, certain terminology has been used for the purposes of descriptive clarity, and not to limit the present invention. Therefore, any appended claims should not be limited to the description of the preferred versions contained herein and should include all such alterations, permutations, and equivalents as fall within the true spirit and scope of the present invention.

Having now fully described this invention, it will be understood to those of ordinary skill in the art that the methods of the present invention can be carried out with a wide and equivalent range of conditions, formulations, and other parameters without departing from the scope of the invention or any embodiments thereof.

TABLE 1

| | Blended solution | Condition for vapor deposition | Contact angles relative to water (degree) | | | | | | | |
|---|---|---|---|---|---|---|---|---|---|---|
| | | | 1 | 2 | 3 | 4 | 5 | 6 | 7 | Average |
| Ex. 1 | 1 | 1 | 115.4 | 115.3 | 115.3 | 115.3 | 115.2 | 115.1 | 115.1 | 115.3 |
| Ex. 3 | 4 | 1 | 113.2 | 114.5 | 113.6 | 114.3 | 112.8 | 115.2 | 114.7 | 114.0 |
| Comp. Ex. 1 | 2 | 1 | 111.3 | 112.4 | 110.5 | 111.8 | 112.1 | 110.9 | 111.2 | 111.5 |
| Comp. Ex. 2 | 3 | 1 | 107.3 | 108.2 | 108.5 | 107.8 | 107.3 | 108.3 | 108.2 | 107.9 |
| Ex. 2 | 1 | 2 | 113.7 | 113.2 | 113.6 | 113.6 | 113.3 | 112.4 | 113.6 | 113.3 |
| Comp. Ex. 3 | 2 | 2 | 105.8 | 106.2 | 105.4 | 106.5 | 105.9 | 106.0 | 106.8 | 106.1 |
| Comp. Ex. 4 | 3 | 2 | 105.8 | 106.2 | 105.4 | 106.5 | 105.9 | 106.0 | 106.8 | 106.1 |

Evaluation of Results

A large difference in water repellency resulted when the contact angle relative to water of the surface of the eyeglass lenses varied by several degrees. As shown in Table 1, the lenses of the Examples, prepared with a vapor deposition material in the form of the perfluoropolyether-modified silane compound denoted by general formula (I), exhibited an improvement in contact angle of about 2 to more than 7 relative to the lenses of the comparative examples, which were prepared under the same vapor deposition conditions.

All patents and publications cited herein are hereby fully incorporated by reference in their entirety. The citation of any publication is for its disclosure prior to the filing date and should not be construed as an admission that such publication is prior art or that the present invention is not entitled to antedate such publication by virtue of prior invention.

What is claimed is:

1. An eyeglass lens, which comprises an outermost layer in the form of a water-repellent vapor deposition film formed by vapor depositing a vapor deposition material in the form of a perfluoropolyether-modified silane compound denoted by general formula (I):

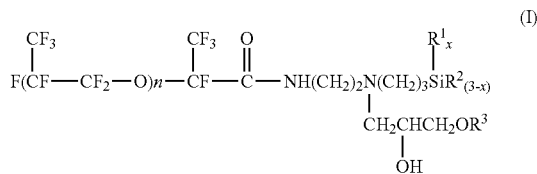

wherein, in general formula (I), R$^1$ denotes an alkyl group with 1 or 2 carbon atoms, x denotes 1 or 0, R$^2$ denotes an alkoxy group with 1 or 2 carbon atoms, R$^3$ denotes a hydrogen atom or a phenyl group, and n denotes an integer ranging from 10 to 40, wherein the compound is at least one compound selected from:

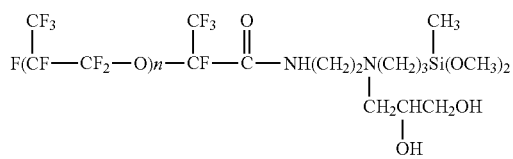

and

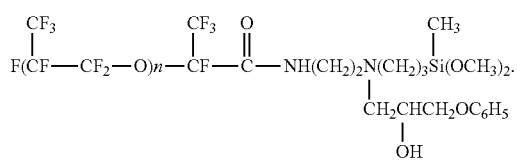

2. The eyeglass lens according to claim 1, wherein the water-repellent vapor deposition film is disposed adjacent to a vapor deposition film formed by vapor depositing a vapor deposition material in the form of silicon oxide.

3. The eyeglass lens according to claim 2, wherein the vapor deposition film formed by vapor depositing a vapor deposition material in the form of silicon oxide is an uppermost layer of a multilayered antireflective film, and a lowermost layer of the multilayered antireflective film is a vapor deposition film formed by vapor depositing a vapor deposition material in the form of silicon oxide.

4. The eyeglass lens according to claim 3, wherein the vapor deposition film of the lowermost layer is disposed adjacent to a hardcoat layer.

5. The eyeglass lens according to claim 4, wherein the hardcoat layer comprises silica colloidal particles.

6. The eyeglass lens according to claim 3, wherein the multilayered antireflective film comprises plural vapor deposition films formed by vapor depositing a vapor deposition material in the form of silicon oxide and plural vapor depositions film formed by vapor depositing a vapor deposition material in the form of zirconium oxide, and the vapor deposition film formed by vapor depositing a vapor deposition material in the form of silicon oxide and the vapor deposition film formed by vapor depositing a vapor deposition material in the form of zirconium oxide are alternately disposed.

7. The eyeglass lens according to claim 1, wherein the water-repellent vapor deposition film has a film thickness ranging from 0.1 nm to 5 μm.

8. The eyeglass lens according to claim 1, which comprises the water-repellent vapor deposition film directly or indirectly on a polycarbonate lens substrate.

9. A method of manufacturing an eyeglass lens comprising an outermost layer in the form of a water-repellent vapor deposition film, which comprises a step of forming the water-repellent vapor deposition film by vapor depositing a vapor deposition material in the form of a perfluoropolyether-modified silane compound denoted by general formula (I) directly or indirectly on a lens substrate:

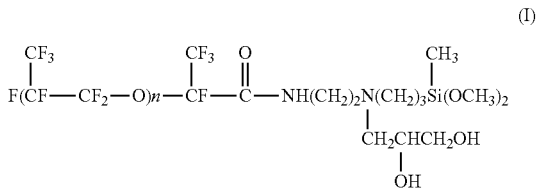

wherein, in general formula (I), R$^1$ denotes an alkyl group with 1 or 2 carbon atoms, x denotes 1 or 0, R$^2$ denotes an alkoxy group with 1 or 2 carbon atoms, R$^3$ denotes a hydrogen atom or a phenyl group, and n denotes an integer ranging from 10 to 40, wherein the compound is at least one compound selected from:

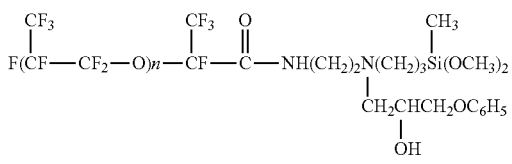

and

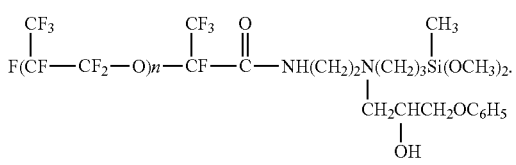

10. The method of manufacturing an eyeglass lens according to claim 9, wherein the water-repellent vapor deposition film is formed on a vapor deposition film formed by vapor depositing a vapor deposition material in the form of silicon oxide.

11. The method of manufacturing an eyeglass lens according to claim 9, wherein the vapor deposition for forming the water-repellent vapor deposition film is carried out by vacuum vapor deposition.

12. The method of manufacturing an eyeglass lens according to claim 11, which comprises carrying out the vacuum vapor deposition in a vapor deposition chamber which is kept to a degree of vacuum of equal to or lower than 3.0×10$^{-2}$ Pa.

13. The method of manufacturing an eyeglass lens according to claim 11, which comprises carrying out the vacuum vapor deposition at a heating temperature of equal to or higher than 500° C.

* * * * *